3,340,247
DISAZO TRIAZINE DYESTUFFS
Henri Riat, Arlesheim, and Karl Seitz, Neu-Allschwil, Switzerland, assignors to Ciba Limited, Basel, Switzerland, a Swiss company
No Drawing. Filed Sept. 8, 1965, Ser. No. 485,936
Claims priority, application Switzerland, Nov. 6, 1961, 12,841/61; Aug. 21, 1962, 9,949/62
8 Claims. (Cl. 260—153)

This is a continuation-in-part of our application Ser. No. 233,155, filed Oct. 25, 1962, now abandoned.

There are described in U.S. Patent No. 3,050,515, filed Mar. 16, 1959, by Raymond Gunst disazo dyestuffs of the formula (1)    $R-N=N-R_1-N=N-R_2-NH-X$ in which R and $R_1$ each represent a benzene or naphthalene residue, $R_2$ represents the residue of a naphthalene sulfonic acid bond to the azo bridge in 4-position and to the —NH— group in 1-position, and X represents a 2-amino-4-halogen-1:3:5-triazine nucleus. It is also mentioned in that specification that, in the manufacture of dyestuffs of the kind defined, 1-amino-naphthalene-8-sulfonic acid can be used to form the residue $R_2$.

It is an object of the present invention to provide disazo dyestuffs of this kind which yield cellulose dyeings having a higher stability of the fiber-dyestuff bond and a better fastness to chlorine especially a better fastness to the treatments with hypochlorite.

Other objects of the invention will become obvious from the following:

The present invention is based on the observation that specially valuable dyestuffs can be obtained when diazo dyestuffs of the formula (1a)
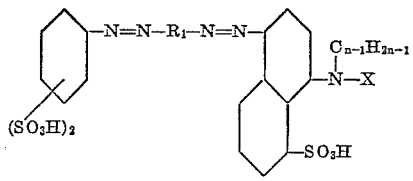

are prepared, in which $R_1$ is a benzene or naphthalene residue more especially a benzene residue free from sulfonic acid groups or a sulfonaphthalene residue bound to the azo linkages in 1:4-position, X represents a mono-halogenated triazine residue, and $n$ represents a whole positive number.

The disazo dyestuffs corresponding to the Formula 1a can be made by a condensing di-or tri-halogen-1:3:5-triazine with an aminodisazo dyestuff of the formula (2)
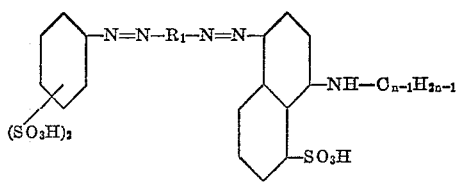

in such a manner that halogenated condensation products are formed.

The starting materials of the Formula 2 can be prepared by coupling a 1-amino-naphthalene-8-sulfonic acid such, for example, as 1:N-methylamino-naphthalene-8-sulfonic acid or 1-amino-naphthalene-8-sulfonic acid, which is not further substituted, with a diazotized aminoazo dyestuff that is prepared by coupling a diazotized aminobenzene disulfonic acid, for example, 1-aminobenzene-2:5-disulfonic acid, with an amine of the benzene series, for example, the ω-methane-sulfonic acid derivatives of aniline, of ortho-methoxyaniline and of ortho-carboxy-aminobenzene (the ω-methane sulfonic acid being split hydrolytically after the dyestuff has been made in order to liberate the amino group) and also meta-toluidine, 3-acetylamino-1-aminobenzene, 3-butyrylamino-1-aminobenzene, 3-ureido-1-aminobenzene, 1-amino - 2 - methyl-5-methoxybenzene, 1-amino-2:5-dimethoxy- or -diethoxybenzene, 1-amino-3-methoxybenzene, 1 - amino-2-methoxy-5-isopropylbenzene, 1-amino-2:5-dimethylbenzene or with 1-aminonaphthalene and more especially 1 - aminonaphthalene-6-or -7-sulfonic acid.

The diazotized aminomonoazo dyestuffs used in preparing the aminodisazo dyestuffs of the Formula 2 given above may be obtained by known methods, for example, with the aid of mineral acids, especially hydrochloric acid, and sodium nitrite.

Coupling of the diazo compounds so obtained with the aforesaid 1-aminonaphthalene sulfonic acids, that are capable of coupling in 4-position, can also be carried out by methods in themselves known.

The condensation of the starting dyestuffs so obtained with trihalogen-triazines, especially trichloro or tribromo-1:3:5-triazine or the mono-condensation products thereof (dihalogen-triazines) is advantageously carried out in the presence of an agent capable of binding acid, such as sodium acetate or sodium carbonate.

The monohalogen-triazine dyestuffs of the invention can also be made from dihalogen-triazine dyestuffs by substituting one of the two halogen atoms with an alkoxy or phenoxy group, but advantageously with an amino group, for example, by reaction with alcohols, phenols or ammonia or with a primary or secondary amine that advantageously has less than 13 carbon atoms. As amines of the kind defined there may be used, for example, methylamine, dimethylamine, ethylamine, diethylamine, propylamine, isopropylamine, butylamine, isobutylamine, hexylamine or cyclohexylamine, and also piperidine, morpholine, γ-methoxy-propylamine, methoxyethylamine, ethanolamine, propanolamines, aniline, N-methylaniline, ortho-, meta- or para-methyl- or methoxyaniline, ortho-, meta- or para-aminobenzene sulfonic acid, aniline disulfonic acid, sulfonanthranilic acid, ortho-, meta- or para-aminobenzoic acid, and also naphthylamine sulfonic acids, such as 1-naphthylamine-6-sulfonic acid, 1- or 2-aminonaphthalenedi- or trisulfonic acids.

The condensation process of the invention is advantageously carried out in the presence of an agent capable of binding acid, such as sodium acetate, sodium carbonate or sodium hydroxide, and under such conditions that one exchangeable halogen atom remains in the finished product, that is to say, for example, in an organic solvent or at a relatively low temperature in aqueous medium.

In the manufacture of the dyestuffs of the invention by condensation of one of the aforesaid aminodisazo dyestuffs with cyanuric chloride and with the more simple hydroxyl or amino compounds, at least the sequence of the condensation operations can generally be chosen as required. However, in some cases, it is advantageous to carry out the condensation with an alcohol or phenol before the condensation with the dyestuff.

The new dyestuffs of the invention are suitable for dyeing or printing a very wide variety of materials, especially materials of fibrous structure that contain cellulose, for example, linen, regenerated cellulose and, more especially, cotton. They are specially suitable for dyeing according to the direct dyeing method from a relatively dilute bath and according to the pad-dyeing process, in which process the goods are impregnated with an aqueous dyestuff solution that may also contain salt and, after an alkali treatment, the dyestuffs are fixed, if necessary with the application of heat, that is to say, they are reacted with the fiber. This latter process and the direct dyeing method, by which many of the dyestuffs obtained by the process of the invention can also be applied, yield valuable dyeings that are fast to washing. Fast prints are obtained by the printing process.

In order to improve the wet fastness properties it is advisable to submit the dyeings and prints so obtained to a thorough rinse with cold water and hot water, if necessary in the presence of a dispersing agent that assists the diffusion of unfixed dyestuff.

Dyeings produced on poly-hydroxylated fibers, especially fibers containing cellulose, with the new dyestuffs are generally distinguished by a good fastness to light, and more especially by an excellent fastness to washing and a very good fastness to chlorine.

If dyeing is carried out by the so-called catalyst process, in which the fixation of the dyestuffs on the fiber is achieved by means of tertiary amines such, for example, as triethylamine or dicyclo-(2:2:2)-triethylene-diamine (aza-dicyclo-octane) or with other basic compounds, for example, N:N-dimethyl hydrazine, if necessary, without the application of heat, the fixation reaction is accelerated in the case of the dyestuffs of the invention, and thus deeper dyeings can be obtained in a shorter time.

The following examples illustrate the invention. Unless otherwise stated, the parts and percentages are by weight:

EXAMPLE 1

19 parts of cyanuric chloride are finely dispersed in 300 parts of ice water. To the dispersion so obtained is added a solution of 72.1 parts of an amino-disazo dyestuff, prepared by coupling the diazo-compound prepared from 1-aminobenzene-2:5-disulfonic acid with 1-aminonaphthalene-6-sulfonic acid, further diazotizing the resulting aminoazo-dyestuff and coupling with 1-amino-naphthalene-8-sulfonic acid in a slightly acid medium (pH 4 to 5), in 500 parts of water, which solution is neutralized with sodium carbonate. The whole is stirred for 2 hours at 5 to 8° C. and the pH value of the solution is kept between 5 and 7 by the gradual addition of a dilute sodium hydroxide solution. When the condensation is terminated, the resulting dichlorotriazine dyestuff is salted out, filtered off, the paste is mixed with a concentrated aqueous solution of 4 parts of mono-sodium phosphate and 4 parts of di-sodium phosphate, and the mixture is dried in vacuo at a moderately raised temperature. The dyestuff so obtained dyes cotton very fast red-brown tints.

EXAMPLE 2

The same procedure is adopted as in Example 1. However, after the condensation with cyanuric chloride, 50 parts of an aqueous ammonia solution of 10% strength are added to the solution of dichloro-triazine dyestuff so obtained, and the mixture is heated for 2 to 3 hours at 30 to 40° C. The resulting monochloro-triazine dyestuff is then salted out, filtered off and dried. It dissolves in water to give a red-brown solution and dyes cotton very fast red-brown tints.

EXAMPLE 3

To an aqueous solution (neutralized with sodium carbonate) of 64 parts of an amino-disazo dyestuff, obtained by coupling diazotized 1-aminobenzene-2:5-disulfonic acid with 1-amino-naphthalene, further diazotization and coupling with 1-aminonaphthalene-8-sulfonic acid in a weakly acid medium is added a neutral aqueous solution of the primary condensation product obtained from 18.5 parts of cyanuric chloride and 17.3 parts of 1-aminobenzene-3-sulfonic acid, and the whole is stirred for a few hours at a temperature between 40 and 60° C., in which process the reaction mixture is kept neutral by the addition of a dilute solution of sodium carbonate. When the pH value remains constant the dyestuff is salted out, filtered off and dried. It dyes cotton fast red-brown tints.

If there is used as condensation agent the primary condensation product obtained from cyanuric chloride and 1-aminobenzene-2-sulfonic acid or 1-amino-benzene-2:5-disulfonic acid, there are obtained dyestuffs with similar properties.

If there is used as condensation agent the corresponding proportion of 6-phenoxy-2:4-dichloro-1:3:5-triazine or 6-methoxy-2:4-dichloro-1:3:5-triazine or 6-phenylthio-2:4-dichloro-1:3:5-triazine, there are obtained dyestuffs that likewise dye cotton fast red-brown tints.

In the following table there are listed further examples of dyestuffs that are obtained when the disazo dyestuffs obtained from the components listed in columns I to III are condensed with cyanuric chloride and the dichloro-triazine derivatives so obtained are, if necessary, reacted with the compounds listed in column IV. Column V shows the tints obtained with the dyestuffs so obtained.

TABLE

| I | II | III | IV | V |
|---|---|---|---|---|
| 1-aminobenzene-2:5-disulfonic acid. | Meta-toluidine | 1-aminonaphthalene-8-sulfonic acid. | Ammonia | Brown. |
| Do | ....do | ....do | Aniline | Do. |
| Do | ....do | ....do | 2-aminobenzoic acid | Do. |
| 1-aminobenzene-2:4-disulfonic acid. | 1-amino-2:5-dimethylbenzene | ....do | Ammonia | Do. |
| 1-aminobenzene-2:5-disulfonic acid. | ....do | ....do | ....do | Do. |
| Do | ....do | ....do | β-hydroxy-ethylamine | Do. |
| Do | ....do | ....do | 1-aminobenzene-3-sulfonic acid. | Do. |
| Do | ....do | ....do | Morpholine | Do. |
| Do | ....do | ....do | Diethanolamine | Do. |
| Do | ....do | ....do | N-methylaniline | Do. |
| Do | ....do | ....do | N-methylaniline-3- or 4-sulfonic acid. | Do. |
| Do | 1-amino-2-methoxy-5-methyl-benzene. | ....do | Ammonia | Reddish brown. |
| Do | ....do | ....do |  | Do. |
| Do | 1-amino-2:5-dimethylbenzene | ....do |  | Orange-brown. |
| 1-aminobenzene-3:5-disulfonic acid. | ....do | ....do |  | Do. |
| Do | ....do | ....do | Ammonia | Brown. |
| 1-aminobenzene-2:5-disulfonic acid. | 3-acetylamino-1-amino-benzene. | ....do |  | Orange-brown. |
| Do | ....do | ....do | Ammonia | Do. |
| Do | 3-ureido-1-aminobenzene | ....do | ....do | Reddish brown. |
| Do | 1-amino-2-methyl-5-acetyl-aminobenzene. | ....do | ....do | Do. |
| Do | Aniline | 1-aminonaphthalene-8-sulfonic acid. | ....do | Orange-brown. |
| Do | 3-methoxyaniline | ....do | ....do | Do. |
| Do | 1-amino-2:5-dimethoxy benzene. | ....do | ....do | Red-brown. |

TABLE—Continued

| I | II | III | IV | V |
|---|---|---|---|---|
| 1-aminobenzene-2:5-disulfonic acid. | 1-aminonaphthalene-7-sulfonic acid. | 1-aminonaphthalene-8-sulfonic acid. | 1-aminobenzene-3-sulfonic acid. | Do. |
| Do. | ____do____ | ____do____ | Ammonia. | Do. |
| Do. | Commercial mixture of 1-aminonaphthalene-6- and 7-sulfonic acid. | ____do____ | ____do____ | Do. |
| 1-aminobenzene-2:4-disulfonic acid. | 1-aminonaphthalene-6-sulfonic acid. | ____do____ | ____do____ | Do. |
| 1-aminobenzene-3:5-disulfonic acid. | ____do____ | ____do____ | | Do. |
| Do. | ____do____ | ____do____ | Ammonia. | Do. |
| 1-aminobenzene-2:5-disulfonic acid. | 1-aminonaphthalene. | ____do____ | ____do____ | |
| Do. | ____do____ | ____do____ | 1-aminobenzene-3:5-disulfonic acid. | Do. |
| Do. | 1-aminonaphthalene-6-sulfonic acid. | ____do____ | Phenol. | Do. |
| Do. | ____do____ | ____do____ | 1-hydroxybenzene-4-sulfonic acid. | Do. |
| Do. | ____do____ | ____do____ | 3-hydroxypropylamine. | Do. |
| Do. | ____do____ | ____do____ | 3-methoxypropylamine. | Do. |
| Do. | ____do____ | ____do____ | 4-acetylamino-1-aminobenzene. | Do. |
| Do. | ____do____ | ____do____ | 2-hydroxy-5-aminobenzoic acid. | Do. |

EXAMPLE 4

62 parts of the amino-disazo dyestuff (2:5-aniline-disulfonic acid→1 - amino - 2:5-dimethylbenzene→1-aminonaphthalene-8-sulfonic acid) are dissolved in 1000 parts of water, and the solution so obtained is neutralized with sodium carbonate. The solution is heated to 60° C. and to it is added a solution of 22 parts of 2:4:5:6-tetra-chlorpyrimidine in 80 parts of acetone. The mixture is stirred for 12 hours at 80° C., and is kept slightly acidic to neutral by the addition of a dilute solution of sodium hydroxide. The resulting trichloropyrimidyl derivative is salted out, filtered off and dried. It dyes cotton fast brown tints.

If the 2:4:5:6-tetra-chlorpyrimidine is replaced by 2:4:6-trichlorpyrimidine, there is obtained a dyestuff with similar properties.

*Dyeing prescription*

2 parts of the dyestuff prepared in the manner described in Example 1 are dissolved in 100 parts of water. A cotton fabric is impregnated on a padding mangle at room temperature with the cold dyestuff solution, and the excess dye-liquor is squeezed out in such a manner that the material retains 75% of its weight of dyestuff solution.

The cotton impregnated in this manner is dried and then impregnated at room temperature with a solution that contains, per liter, 10 parts of sodium hydroxide and 300 parts of sodium chloride. The cotton is then squeezed to a liquor uptake of 75% and then steamed for 60 seconds at 100 to 101° C. The material is then rinsed, treated in a sodium bicarbonate solution of 0.5% strength, rinsed, soaped at the boil for ¼ hour in a 0.3% solution of a non-ionic detergent, rinsed again and then dried. There is obtained a red-brown dyeing that is fast to washing and light.

For testing the fiber-dyestuff stability one part of dyeing may be treated for ½ hour with 40 parts of an aqueous solution containing per liter 20 g. of acetic acid, mixed with cold and warm water and dried. The alteration (less of strength) of the dyeing is proportional to the instability of the bond.

What is claimed is:

1. A water-soluble disazo dyestuff of the formula

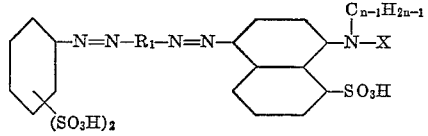

in which $R_1$ represents a member selected from the group consisting of a benzene and a naphthalene radical that is bound to the azo groups in 1-position and 4-position, said benzene radical being selected from the group consisting of the unsubstituted 1,4-phenylene and the benzene radicals containing a substituent selected from the group consisting of lower alkyl, acetylamino and lower alkoxy and the naphthalene radical being selected from the group consisting of the 1,4-naphthalene and the sulfonaphthylene radicals, $n$ represents a whole number from 1 to 3, and X represents a mono-chloro trazine nucleus and further substituted by groups selected from the class consisting of chloro, lower alkoxy, phenoxy, sulfo-phenoxy, phenylthio, amino, hydroxy lower alkylamino, lower alkoxyalkylamino, phenylamino, monosulfophenylamino, disulfophenylamino, carboxyphenylamino, morpholino, N-lower alkyl-N-phenylamino, N-lower alkyl-N-sulfophenylamino and acetylamino-aminobenzene.

2. A disazo dyestuff of the formula

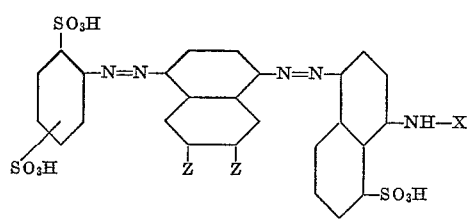

in which one Z represents hydrogen and the other Z represents a sulfonic acid group, and X represents 4-amino-2-chloro-1:3:5-triazine residue bound to the —NH— group in 6-position.

3. A disazo dyestuff of the formula

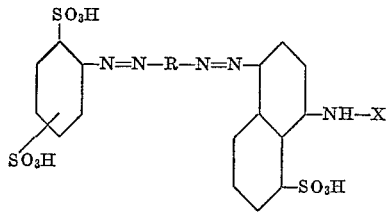

in which R represents 1:4-phenylene radical and X represents 4-amino-2-chloro-1:3:5-triazine residue bound to the —NH— group in 6-position.

4. A disazo dyestuff of the formula

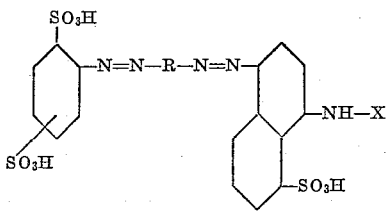

in which R is xylidine radical bound to the azo group in the 1- and 4-positions, and X is 4-amino-2-chloro-1:3:5-triazinyl group bound to the —NH— group in 6-position.

5. The dyestuff of the formula

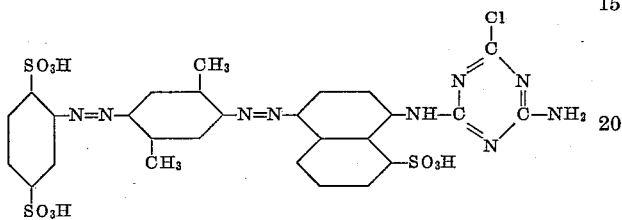

6. The dyestuff of the formula

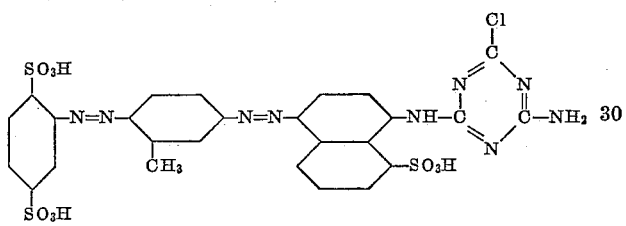

7. The dyestuff of the formula

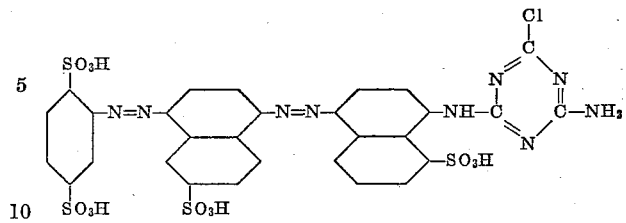

8. The dyestuff of the formula

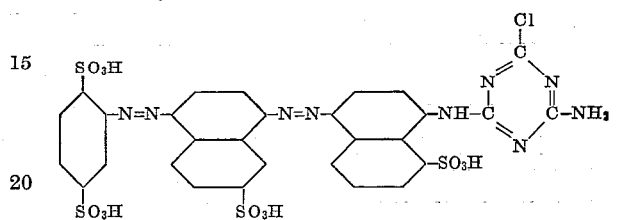

References Cited

UNITED STATES PATENTS

| | | | |
|---|---|---|---|
| 2,945,022 | 7/1960 | Fasciati et al. | 260—153 |
| 3,038,893 | 6/1962 | Andrew | 260—153 X |
| 3,050,515 | 8/1962 | Gunst | 260—153 |
| 3,057,844 | 10/1962 | Andrew et al. | 260—153 |
| 3,057,846 | 10/1962 | Andrew et al. | 260—153 X |

CHARLES B. PARKER, *Primary Examiner.*

JOSEPH P. BRUST, *Examiner.*

D. M. PAPUGA, *Assistant Examiner.*